(12) United States Patent
Rogers

(10) Patent No.: US 10,700,423 B2
(45) Date of Patent: Jun. 30, 2020

(54) CONFORMAL ANTENNA WITH DIELECTRIC LENS

(71) Applicant: The Boeing Company, Chicago, IL (US)

(72) Inventor: John E. Rogers, Owens Cross Roads, AL (US)

(73) Assignee: THE BOEING COMPANY, Chicago, IL (US)

( * ) Notice: Subject to any disclaimer, the term of this patent is extended or adjusted under 35 U.S.C. 154(b) by 18 days.

(21) Appl. No.: 16/141,552

(22) Filed: Sep. 25, 2018

(65) Prior Publication Data
US 2020/0099127 A1 Mar. 26, 2020

(51) Int. Cl.
| | | |
|---|---|---|
| H01Q 1/38 | (2006.01) |
| H01Q 1/28 | (2006.01) |
| B64C 1/36 | (2006.01) |
| H04B 7/06 | (2006.01) |
| H01Q 3/26 | (2006.01) |

(52) U.S. Cl.
CPC ............. *H01Q 1/287* (2013.01); *B64C 1/36* (2013.01); *H01Q 1/38* (2013.01); *H01Q 3/26* (2013.01); *H04B 7/06* (2013.01)

(58) Field of Classification Search
CPC ............ H01Q 1/287; H01Q 1/38; H01Q 3/26
See application file for complete search history.

(56) References Cited

PUBLICATIONS

Uehara, K., et al., "Lens-Coupled Imaging Arrays for the Millimeter- and Submillimeter-Wave Regions" IEEE Transactions on Microwave Theory and Techniques, May 1992, pp. 806-811, vol. 40, No. 5.
Raman, S., et al., "A W-Band Dielectric-Lens-Based Integrated Monopulse Radar Receiver", IEEE Transactions on Microwave Theory and Techniques, Dec. 1998, pp. 2308-2316, vol. 46, No. 12.
Wu, X., et al., "Design and Characterization of Single- and Multiple-Beam MM-Wave Circularly Polarized Substrate Lens Antennas for Wireless Communications", IEEE Transactions on Microwave Theory and Techniques, Mar. 2001, pp. 431-441, vol. 49, No. 3.
Mall, L., et al., "Millimeter-Wave Proximity-Coupled Microstrip Antenna on an Extended Hemispherical Dielectric Lens", IEEE Transactions on Antennas and Propagation, Dec. 2001, pp. 1769-1772, vol. 49, No. 12.
Yi, J., et al., "Restoring in-phase emissions from non-planar radiating elements using a transformation optics based lens", Applied Physics Letters, 2015, pp. 024101-1-024101-5, vol. 107.

*Primary Examiner* — Graham P Smith
(74) *Attorney, Agent, or Firm* — Gates & Cooper LLP

(57) ABSTRACT

A conformal antenna having dielectric lenses disposed over the antenna elements is disclosed. The antenna comprises a circuit board having a composite dielectric. The composite dielectric includes an array of a plurality of antenna elements disposed on the top surface and a conductive ground plane disposed on the bottom surface. A conductor extends from an antenna input through the composite dielectric, the conductor forming microstrip with the bottom surface conductive ground plane. The top surface of the composite dielectric further comprises at least one dielectric lens, each dielectric lens disposed over only one antenna element of at least a subset of the plurality of antenna elements.

21 Claims, 9 Drawing Sheets

CONFORMAL ANTENNA WITH DIELECTRIC LENS

BACKGROUND

1. Field

The present disclosure relates to systems for receiving and transmitting signals, and in particular to a conformal antenna having one or more dielectric lenses and a method for producing same.

2. Description of the Related Art

There is a need for sensors capable of conforming to non-planar surfaces such as aircraft wings and fuselages. Such sensors, known as conformal sensors, substantially conform to the contours of the surface that they are mounted on or of which surface they form a part. Low profile conformal sensor nodes are useful in many applications, including structural health monitoring and diagnostic testing. With regard to structural health monitoring, conformal antennas in sensor nodes can gather information about an aircraft in real-time, including airframe characteristics (e.g., hoop stress, shear stress, compression, corrosion resistance, bending, torsion, crack growth, high local loads, longitudinal stress and impacts). With regard to diagnostic testing, conformal antennas in sensor nodes can be used for worker safety and aircraft condition monitoring on the factory floor.

Unmanned aerial vehicles (UAVs) have conformal surfaces with low radii of curvature, and typically need light weight antennas with low radar cross sections and low air drag for improved efficiency. Also, like other aircraft, UAV surfaces are typically either metallic or a carbon fiber material, which are conductive in nature and may change the behavior of an antenna.

Existing planar antennas including co-planar microstrip feed and pin feed antennas are inherently bandwidth-limited due to their resonant nature. Furthermore, pin feed antennas are not recommended for conformal applications as vias are well-known to be the first failure point during flexure. The bandwidth of a patch antenna has been shown to be increased by using an aperture coupled feed line.

However, even with aperture-coupled feed lines, the bandwidth of conformal antennas can be insufficient for some applications. What is needed is a conformal antenna with enhanced bandwidth characteristics.

SUMMARY

To address the requirements described above, this document discloses a conformal antenna having dielectric lenses disposed over aperture coupled antenna elements. One embodiment is evidenced by a conformal antenna, comprising: a circuit board that has a composite dielectric. The composite dielectric includes a top surface and a bottom surface. A bottom surface conductive ground plane is disposed on the bottom surface of the composite dielectric. An array of a plurality of antenna elements and at least one dielectric lens is disposed on the top surface of the composite dielectric with each dielectric lens disposed over only one antenna element of at least a subset of the plurality of antenna elements. A conductor extends from an antenna input through the composite dielectric and forms a microstrip with the bottom surface conductive ground plane. Selected embodiments include the antenna where the dielectric lens is non-planar, and in which the at least one dielectric lens comprises (for example) a right circular cone having a base adjacent the only one antenna element of the at least a subset of the plurality of antenna elements. Further embodiments include embodiments in which the at least one dielectric lens is of a shape different than at least one another dielectric lens disposed over only one antenna element of another subset of the plurality of antenna elements. In a further embodiment, the array of the plurality of antenna elements comprises a plurality of rows of antenna elements, the subset of plurality of array elements comprises a first row of antenna elements, and the another subset of the plurality of array elements comprises a second row of antenna elements adjacent the first row of antenna elements. In further embodiments, the at least one dielectric lens comprises a first right circular cone having a first base disposed over and adjacent to the only one antenna element of the at least a subset of the plurality of antenna elements, and the at least one another dielectric lens comprises a second right circular cone having a second base disposed over and adjacent to the only one antenna element of the another subset of the plurality of antenna elements. In such embodiments, the first right circular cone and second right circular cones may be of different heights or base dimensions.

Another embodiment is evidenced by a method of forming a conformal antenna having dielectric lenses. The method comprises disposing an array of conductive antenna elements on a top surface of a first dielectric layer, disposing a conductor on a bottom surface of a second dielectric layer or a top surface of a third dielectric layer, disposing a bottom surface conductive ground plane on a bottom surface of a fourth dielectric layer, laminating the first dielectric layer, the second dielectric layer, the third dielectric layer, and the fourth dielectric layer to form a composite dielectric, and forming at least one dielectric lens, each dielectric lens disposed over only one antenna element of at least a subset of the plurality of conductive antenna elements. Upon lamination the conductor is disposed between each of the conductive antenna elements and the bottom surface conductive ground plane; and extends from an antenna input and forms a microstrip between the top surface conductive ground plane and the bottom surface conductive ground plane. Another embodiment is evidenced by a conformal antenna, formed by performing the foregoing steps.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

In this disclosure, a bandwidth-enhanced conformal antenna is presented. Bandwidth is enhanced by using an aperture coupled antenna element with an inclusive slot and dielectric lens on each antenna element. The slot and dielectric lens decrease the axial ratio thereby increasing the circular polarization bandwidth. Circularly polarized antennas, in comparison to linearly polarized antennas, are generally desired as they have less power loss from transmitter to receiver due to antenna misalignment. Furthermore, the disclosed antenna has a lower ground plane that minimizes any change in the antenna's electrical behavior due to the presence of conductive surfaces (e.g., airplane wing, fuselage, etc.); better known as "surface agnostic" behavior.

The antenna comprises a number of features which can be characterized by a number of embodiments. Such features may also be combined in selected embodiments as disclosed further herein. One feature is that the antenna has an embedded RF microstrip with a lower ground plane for minimizing any change in the antenna's electrical behavior due to conductive surfaces. Another feature is that the antenna uses an aperture coupled feed network to simplify antenna feeding, planar arraying, and reduce failure due to antenna flexure. Still another feature is that the antenna can utilize thin RF dielectrics for conformal applications due to the use of an aperture coupled feed. Yet another feature is that the antenna is circularly polarized with increased polarization bandwidth by using aperture coupled antenna elements with inclusive slots and printed dielectric lens. Finally, the antenna also uses additive 3D printing or deposition techniques to print non-planar dielectric lens on the surface of the antenna elements.

Figure 1A:
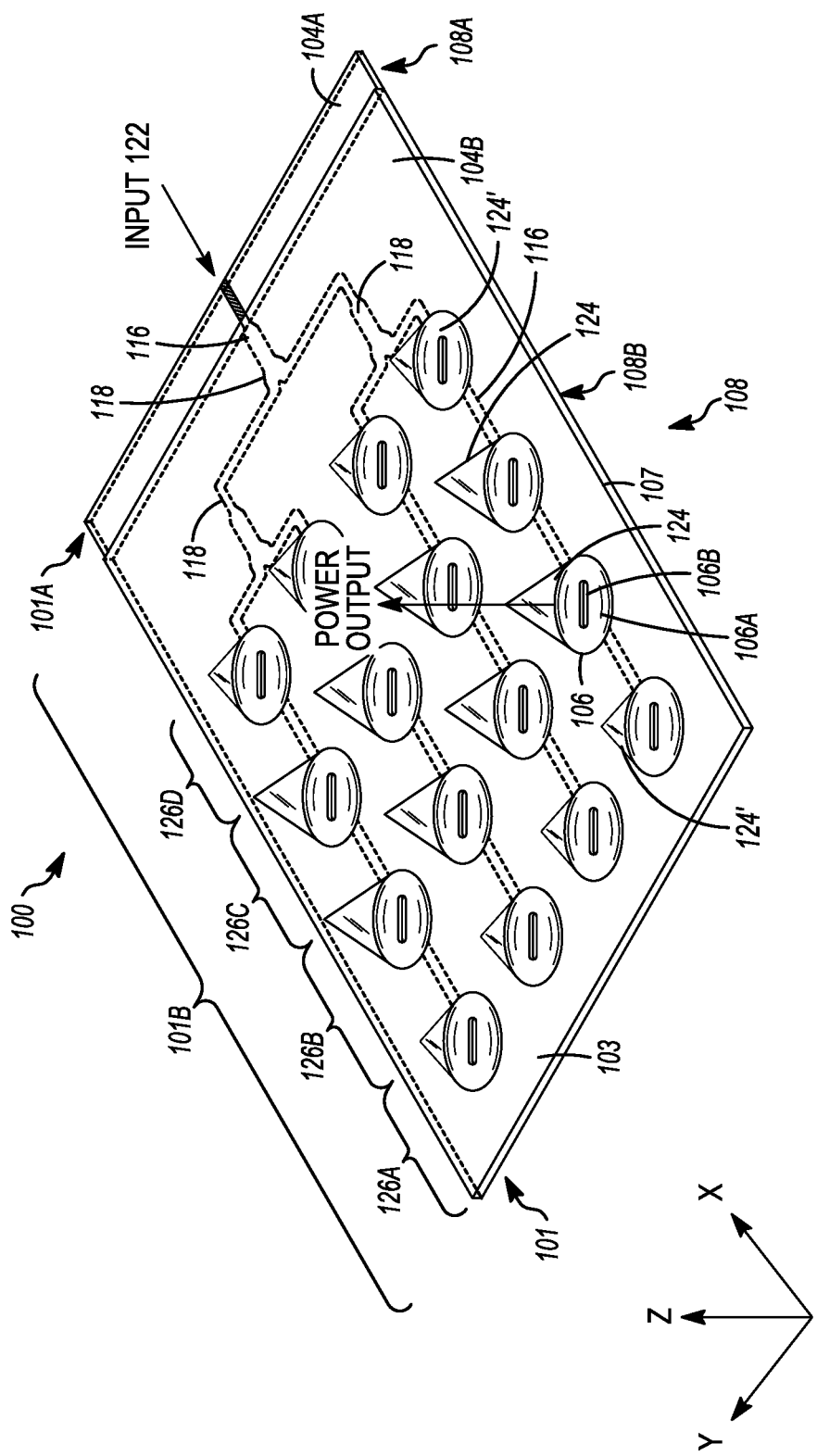
FIGS. 1A and 1B are diagrams illustrating one embodiment of the conformal antenna having a dielectric lens.
Figure 1B:
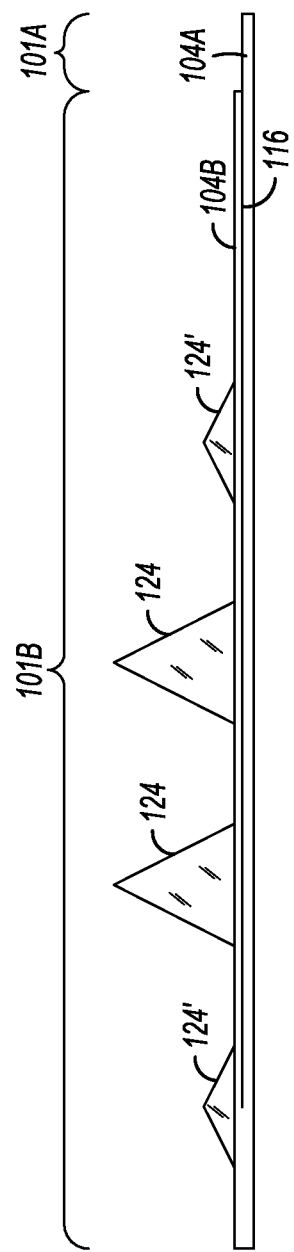

FIGS. 1A and 1B are diagrams illustrating one embodiment of the conformal (i.e., conforming to the surface to which it is applied) antenna 100 having a dielectric lens (hereinafter alternatively referred to simply as antenna 100).

FIG. 1A is a diagram presenting a perspective view of the antenna 100, while FIG. 1B is a diagram presenting a side view of the antenna 100. The antenna 100 includes an RF circuit board 101 having a composite dielectric 103. The RF circuit board 101 includes a circuit board first portion 101A and a circuit board second portion 101B. The RF circuit board 101 also comprises a top planar surface 104 that has a first top surface planar portion 104A and a second top surface planar portion 104B. The second top surface planar portion 104B has at least one antenna element 106. In the illustrated embodiment, a 4×4 array of antenna elements 106 is included, although the array may be non-square and may have a greater or lesser number of antenna elements 106.

The RF circuit board 101 also comprises a bottom planar surface 108 which has a first bottom surface planar portion 108A and a second bottom surface planar portion 108B. A bottom surface ground plane 107 extends along the first bottom surface planar portion 108A and the second bottom surface planar portion 108B. A conductor 116 extending on a top surface of the circuit board first portion 101A and through the circuit board second portion 101B forms a microstrip with the bottom surface ground plane 107 of the first bottom surface planar portion 108A and the second bottom surface planar portion 108B.

In the illustrated embodiment, the conductor 116 includes one or more power dividers 118 disposed along the X-axis between the antenna input 122 and the antenna elements 106. The power dividers 118 divide the antenna input into signals of reduced power that are thereafter provided to downstream antenna elements 106.

Each antenna element 106 comprises a conductive antenna element portion 106A having a conductive surface with a slot (or aperture) 106B therein. This aperture 106B couples the antenna element 106 to the microstrip feed formed by the conductor 116. The microstrip feed is electrically coupled to the bottom surface ground plane 107 with the dielectric material of the composite dielectric 103 therebetween. Each antenna element 106 also has an associated dielectric lens such as first dielectric lens 124 associated with antenna element 106 or second dielectric lens 124' associated with second antenna element 106'. The dielectric lenses 124 and 124' are hereinafter alternatively referred to simply as dielectric lens 124.

In the illustrated embodiment, this exemplary antenna 100 has a 4×4 array of aperture coupled antenna elements 106 formed by conductive antenna element portions 106A with inclusive slots 106B, a microstrip feed network formed by conductor 116 with power dividers 118, and a lower ground plane 107. There are four dielectric layers separating the three conductive layers. The dimensions of the antenna elements (i.e., diameter, slot length, slot width) and dielectric lens (i.e., diameter, height) are determined to maximize radiated power at the desired operating frequency.

In the exemplary illustrated embodiment, each of the dielectric lenses 124 comprises a right circular cone of dielectric material with the base of the cone adjacent the associated antenna element. Also in the illustrated embodiment, at least one of the dielectric lenses has a shape different than the dielectric lenses associated in another subset of antenna elements 106. In the illustrated embodiment, the 4×4 array of antenna elements includes elements arranged in multiple rows or columns. As illustrated, the dielectric lenses 124 associated with the antenna elements in rows 126B and 126C of antenna elements differ from the dielectric lenses 124' associated with the antenna elements in rows 126A and 126D. Hence, if the rows 126B and 126C of antenna elements 106 represent a first subset of the antenna elements 106 of the antenna 100 and rows 126A and 126D of antenna elements 106 represent a second subset of antenna elements, dielectric lens 124 disposed over the antenna elements of the first subset of antenna elements 106 is of a shape different than dielectric lens 124' disposed over the antenna element 106' of another subset of the plurality of antenna elements, with each dielectric lens 124 being disposed over only one antenna element 106. In the illustrated embodiment, the dielectric lenses 124 are all right circular cones, and the dielectric lenses 124 associated with the first subset of antenna elements (rows 126B and 126C) have a first height greater than a second height of the dielectric lenses 124' associated with the second subset of antenna elements 106 (rows 126A and 126D).

Other lens shapes (e.g., cylinder, hemisphere, hemi-elliptical, etc.) can also be utilized for the dielectric lens 124. The dielectric lenses 124 may also comprise shapes that are asymmetric in the X and Y axes so that the performance characteristics of the antenna 100 differ in the X-Z and Y-Z planes. Although the outer surface of the illustrated dielectric lenses 124 are concave, other embodiments in which the outer surface of the dielectric lenses are convex may be employed.

Likewise, the dielectric lenses 124 may be of the same shape, but the dielectric lenses 124 associated with different subsets of antenna elements 106 may be comprised of dielectric materials with different electrical properties. Also, the dielectric lenses 124 associated with different subsets of antenna elements 106 may be of both different shape and made from dielectric materials having different properties. Finally, in selected embodiments, the dielectric lenses 124 are arranged in patterns that differ in both X and Y directions. For example, the dielectric lenses 124 disposed over antenna elements 106 closest the center of the array may be of a different shape than those dielectric lenses 124 disposed over antenna elements disposed a distance away from the center of the array. In one embodiment, the dielectric lenses 124 are characterized by a low dielectric loss tangent and a relative permittivity range of 2-4.

Figure 2A:
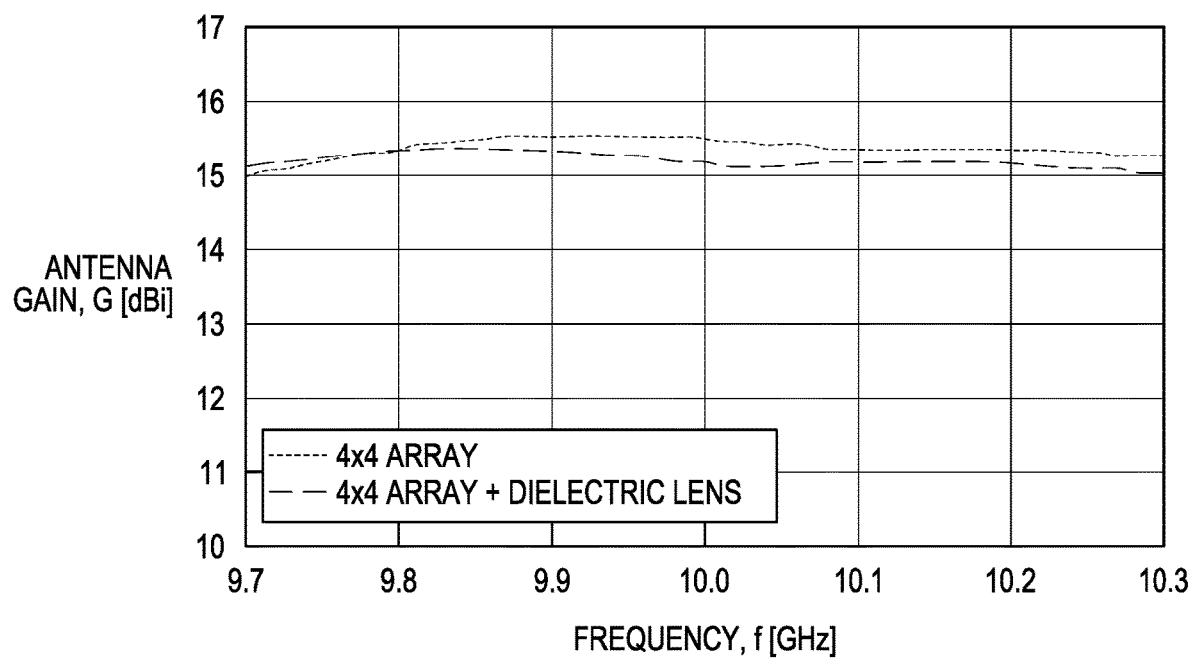
FIGS. 2A and 2B are diagrams depicting plots of the predicted performance of a 4×4 conformal antenna having a dielectric lens designed to operate near 10 GHz.
Figure 2B:
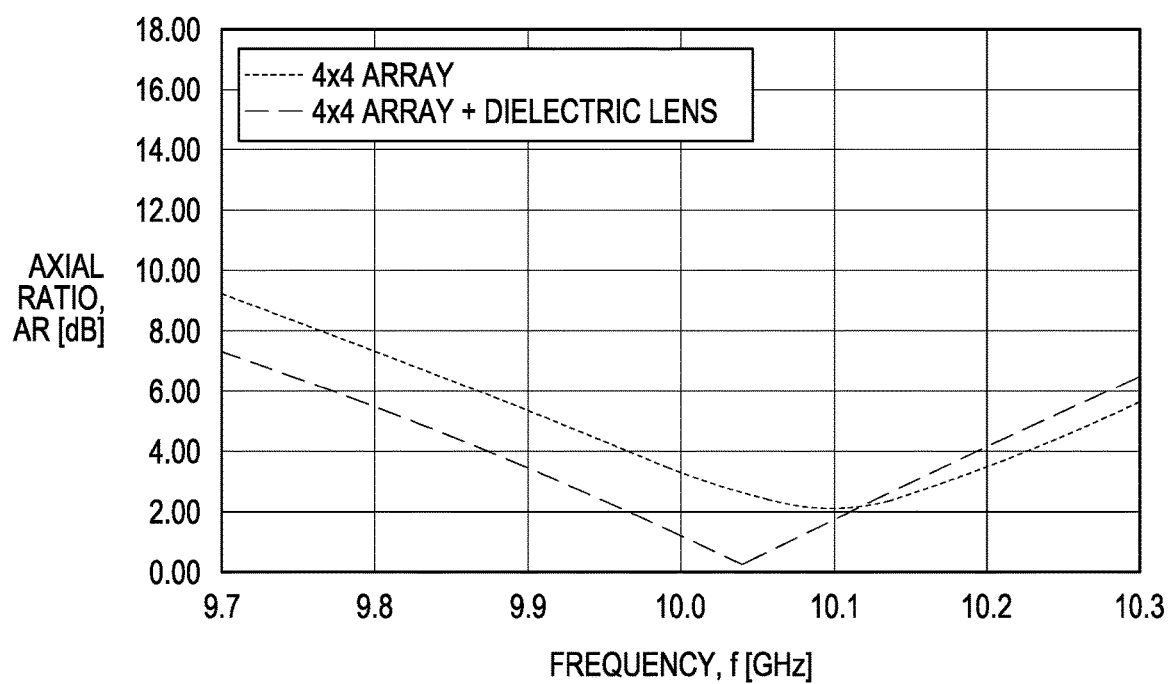

FIGS. 2A and 2B are diagrams depicting plots (generated with a finite element model (FEM) solver) of the predicted performance of a 4×4 conformal antenna with dielectric lens designed to operate near 10 GHz. The surface dimensions of the 4×4 array are 80 mm×55 mm and the board has four 10 Mil PYRALUX layers.

FIG. 2A is a diagram illustrating the predicted antenna gain (dBi) as a function of frequency (GHz) for a standard 4×4 array without the dielectric lenses and for a 4×4 array of identical design, but including the dielectric lenses (such as is illustrated in FIGS. 1A and 1B). The gain of the two arrays is very similar with the dielectric lens decreasing the gain less than 0.5 dB across 9.7 to 10.3 GHz.

FIG. 2B is a diagram showing the predicted axial ratio of the standard 4×4 array without the dielectric lenses and for the 4×4 array with the dielectric lenses. The results show that the 4×4 array with the dielectric lenses 124 provides a 2:1 axial ratio bandwidth of greater than 230 MHz or a 43% improvement.

Figure 3:
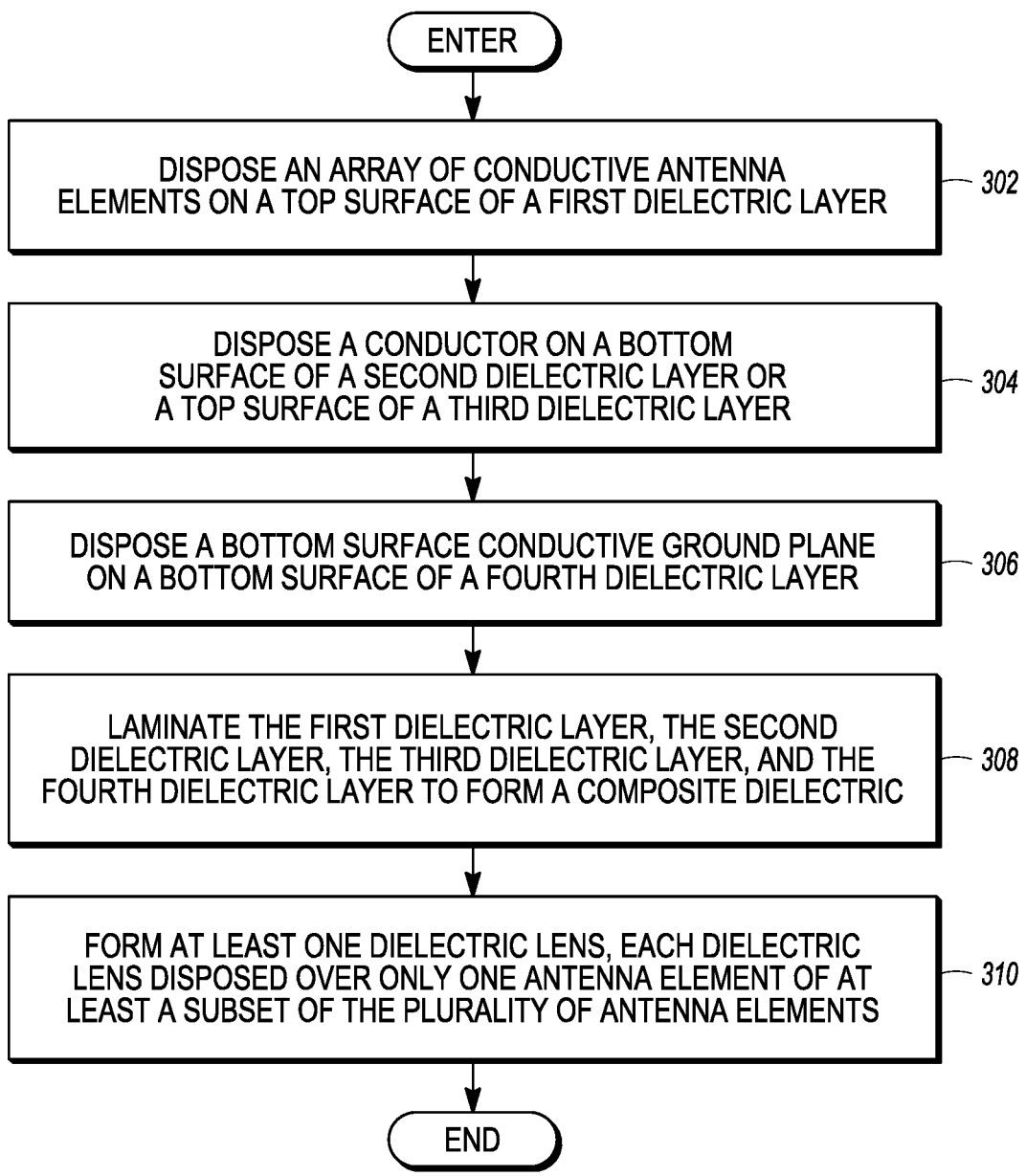
FIG. 3 is a diagram illustrating exemplary operations that can be used to produce the conformal antenna having the dielectric lens.
Figure 4:
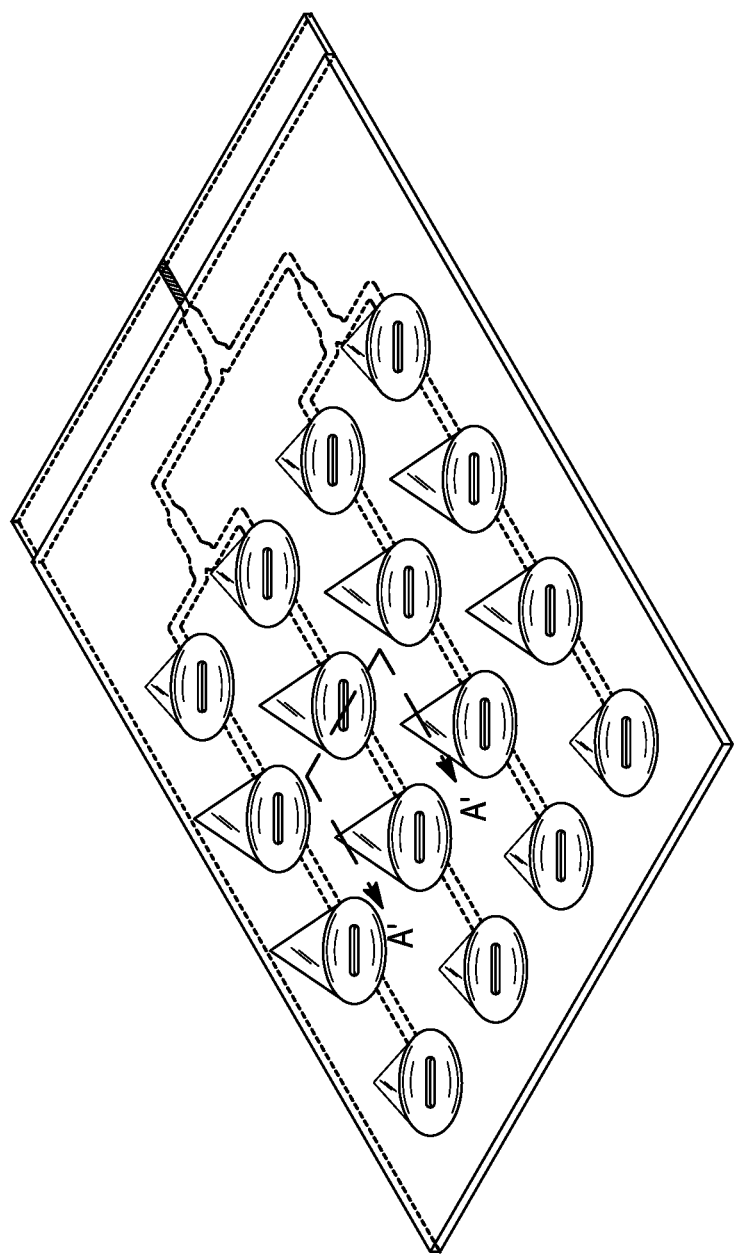
FIG. 4 is a diagram illustrating the slice A-A' of the antenna depicted in FIGS. 5A-5C.
Figure 5A:
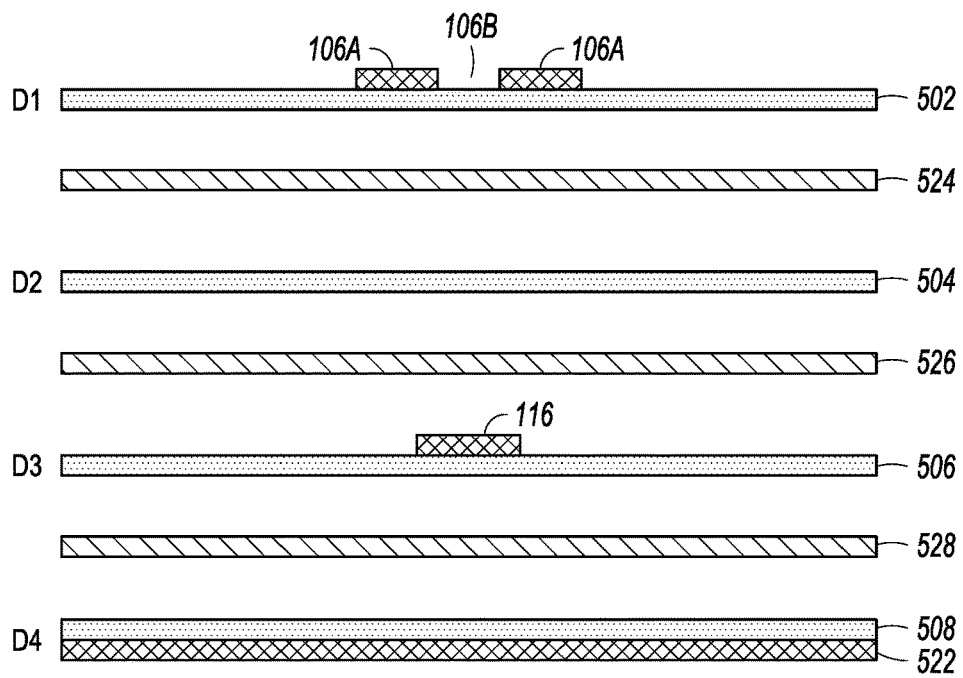
FIGS. 5A-5C are diagrams depicting the conformal antenna having dielectric lenses at different stages of a representative production process at slice A-A' of FIG. 4.
Figure 5B:
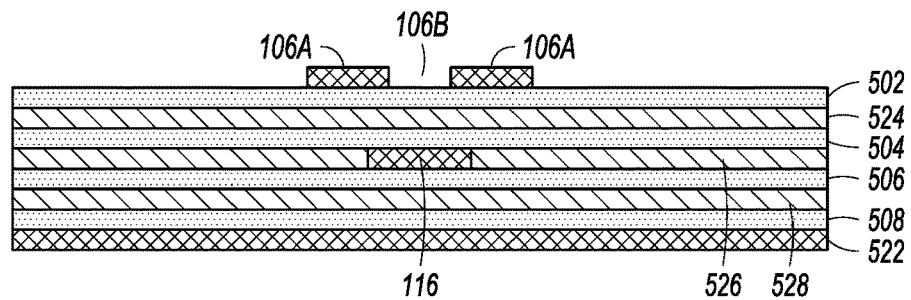
Figure 5C:
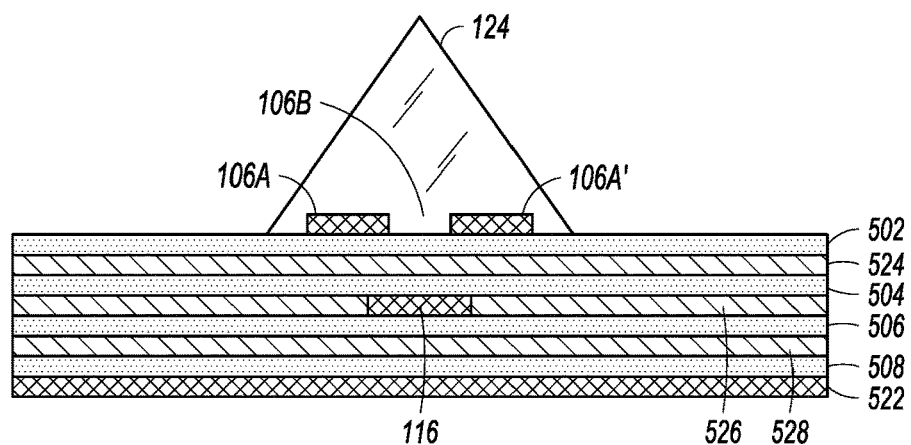
Figure 6:
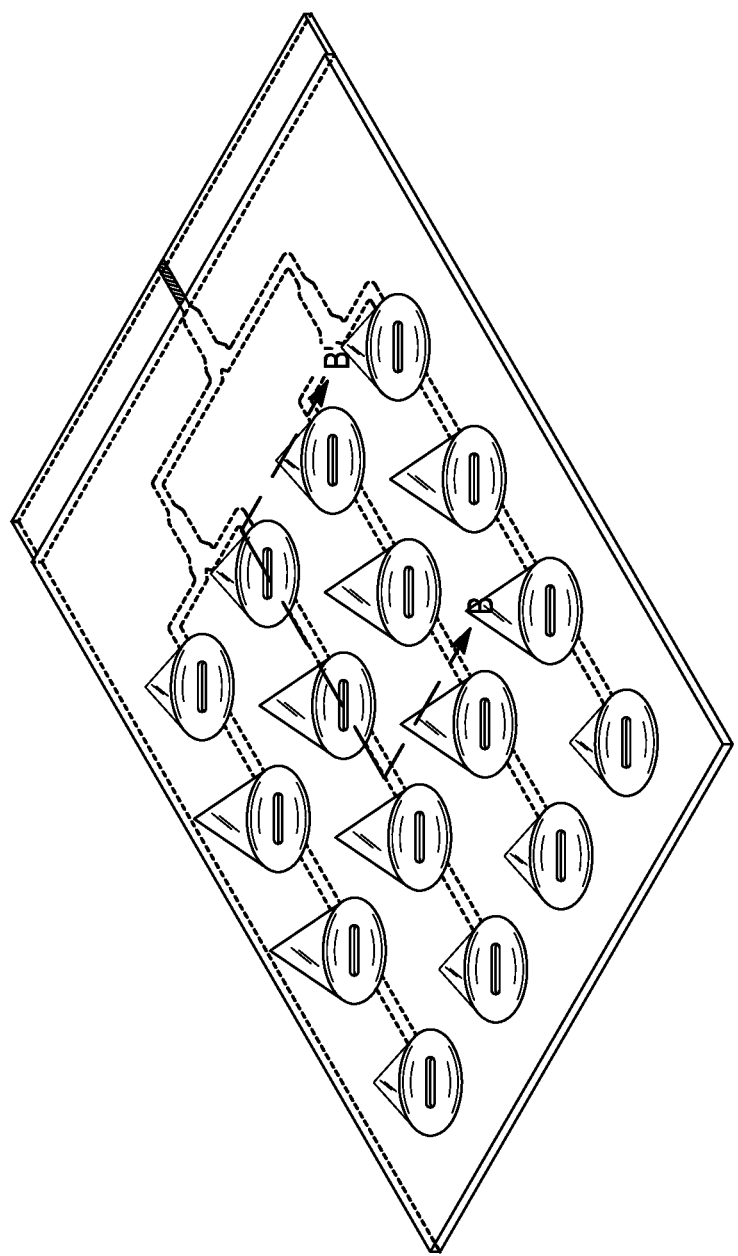
FIG. 6 is a diagram illustrating the slice B-B' of the antenna depicted in FIGS. 7A-7C.

FIG. 3 is a diagram illustrating exemplary operations that can be used to produce the conformal antenna 100 having the dielectric lens 124. FIG. 3 will be discussed in conjunction with FIGS. 4, 5A-5C, 6, and 7A-7C, which are diagrams depicting the antenna 100 at different stages of a representative production process. FIG. 4 is a diagram illustrating the cut A-A' of the antenna 100 depicted in FIGS. 5A-5C, while FIG. 6 is a diagram illustrating the cut B-B' of the antenna 100 depicted in FIGS. 7A-7C.

Turning now to FIG. 3, in block 302, one or more conductive antenna element portions 106A having slots 106B are disposed on a top surface of a first dielectric layer 502 (D1). In block 304, a conductor 116 is disposed on a top surface of a third dielectric layer 506 (D3) or a bottom surface of a second dielectric layer 504 (D2). In the illustrated embodiment, the conductor 116 is disposed on the top surface of the third dielectric layer 506 (D3). In block 306, a bottom surface conductive ground plane 522 is disposed on a bottom surface of a fourth dielectric layer 508 (D4).

In block 308, the first dielectric layer 502, the second dielectric layer 504, the third dielectric layer 506, and the fourth dielectric layer 508 are aligned so that the conductor 116 is disposed between each of the antenna elements 106 and the bottom surface conductive ground plane 522 and extends from an antenna input 122 and forms a microstrip with the bottom surface conductive ground plane 522 and thereafter laminated to form the composite dielectric 103. Accordingly, upon lamination, the conductor 116 is disposed between each of the antenna elements 106 and the bottom surface conductive ground plane 522 and extends from an antenna input 122 and forms a microstrip with the bottom surface conductive ground plane 522.

In block 310, at least one dielectric lens 124 is disposed over only one antenna element 106 of the plurality of antenna elements 106 in the array. In one embodiment the at least one dielectric lens 124 is formed over the associated antenna element 106 by 3D printing over each antenna element 106 using a dielectric material (e.g., acrylonitrile butadiene styrene (ABS), polylactic acid (PLA), thermoplastic polyurethane (TPU), etc.). This can be accomplished by printing the dielectric lens 124 directly on the surface of the first dielectric layer 502 or can be accomplished by printing (or otherwise manufacturing) the dielectric lens 124 in a separate operation, then adhering the dielectric lens 124 at the desired location over the associated antenna element 106 of the antenna 100. In the exemplary illustrated embodiment in FIGS. 1A and 1B the surface of the dielectric lens 124 covers the entire surface of the conductive antenna element portion 106A. Further, in the illustrated embodiment, the dielectric lens 124 extends a small distance beyond the outer periphery of the antenna element itself, thus assuring that energy entering or leaving the conductive antenna element portion 106A passes through some portion of the dielectric lens 124.

Figure 7A:
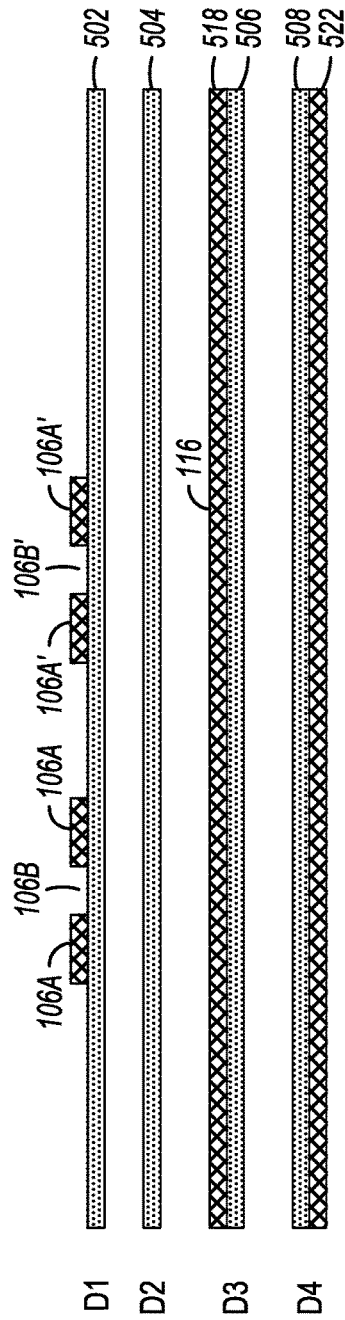
FIGS. 7A-7C, which depict the conformal antenna and dielectric lenses at the different stages of the production at the slice B-B' illustrated in FIG. 6.
Figure 7B:
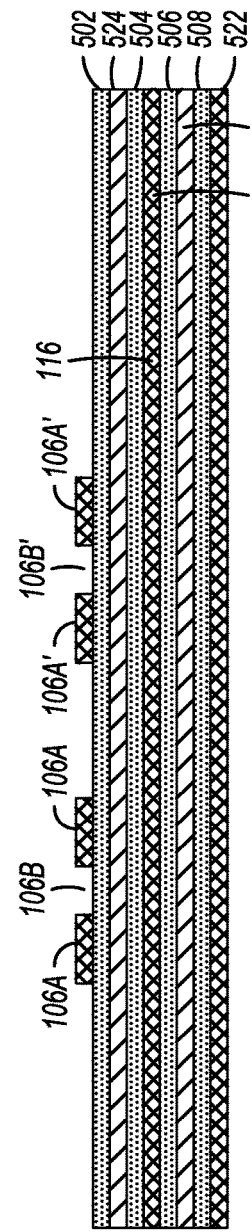
Figure 7C:
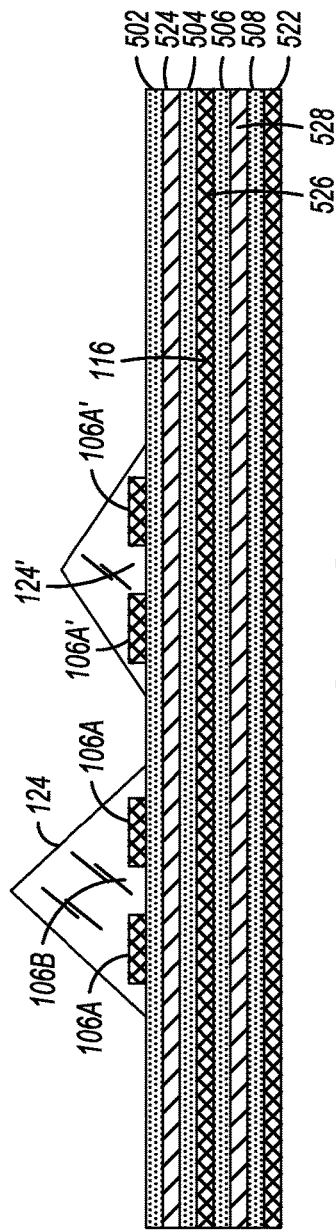

The foregoing steps illustrate the creation of one antenna element 106 with one dielectric lens 124 on the RF circuit board 101. Typically, the antenna 100 comprises an array of elements with dielectric lenses such as the 4×4 array of elements illustrated in FIG. 1A. In such cases, the operations disclosed above include analogous operations as applied to any other desired antenna elements 106 in the array. For example, FIGS. 7A-7B illustrate the 100 at different stages of production along the cut B-B' depicted in FIG. 6. Note that a second conductive antenna element portion 106A' having second inclusive slot 106B' is disposed on the top side of the first dielectric layer 502. FIGS. 7A-7B also illustrate disposing the conductor 116 such that it extends through composite dielectric 103.

Furthermore, in any combination or all of the foregoing operations, the disposition of conductive material on the dielectric may be accomplished by additive methods such as printing, or film deposition of suitable conductive materials (e.g., silver, copper, etc.) to the appropriate surface of the dielectric. Deposition of conductive material may also be accomplished by combined additive and subtractive methods such as laser etching, milling, or wet etching. Hence, the conductive materials may be deposited on the entire surface of the dielectric layer(s) and unwanted portions etched away. For example, the top of the first dielectric layer 502 may be formed by disposing a conductive material along the entire top surface, then etching or otherwise removing the conductive material from the slot 106B and the area surrounding the conductive antenna element portion 106A.

The lamination of the first dielectric layer 502, the second dielectric layer 504, the third dielectric layer 506, and the fourth dielectric layer 508 can be accomplished by disposing a first adhesive film 524 between the first dielectric layer 502 and the second dielectric layer 504, disposing a second adhesive film 526 between the second dielectric layer 504 and the third dielectric layer 506, and disposing a third adhesive film 528 between the third dielectric layer 506 and the fourth dielectric layer 508. Portions of the adhesive films 524, 526, and 528 that must be removed to achieve the structure shown in FIGS. 5A-5C may be removed before lamination or processed after lamination (e.g., using an etching technique). Further, dielectric layers 502, 504, 506 and 508 may be created in any order, but unless otherwise noted, should be layered as illustrated before lamination. Nominally, dielectric layers 502, 504, 506 and 508 are composed of a dielectric material having a relative permittivity (ratio of absolute permittivity to the permittivity of a vacuum) of approximately ten.

Signal Transception

The foregoing antenna 100 can be used to transmit and/or receive (transceive) signals. In transmission, signals provided to the feed created by conductor 116 are transformed into a transmitted RF signal by antenna elements 106 and associated structures. In reception, RF signals are provided to the antenna elements 106 and associated structures and transformed into a received signal at the conductor 116. For example, referring again to FIG. 1A, when used for transmission, the antenna 100 receives a signal at power input, and this signal is provided by the conductor 116 to the aperture coupled antenna elements 106 for transmission as an RF signal.

Hardware Environment

Figure 8:
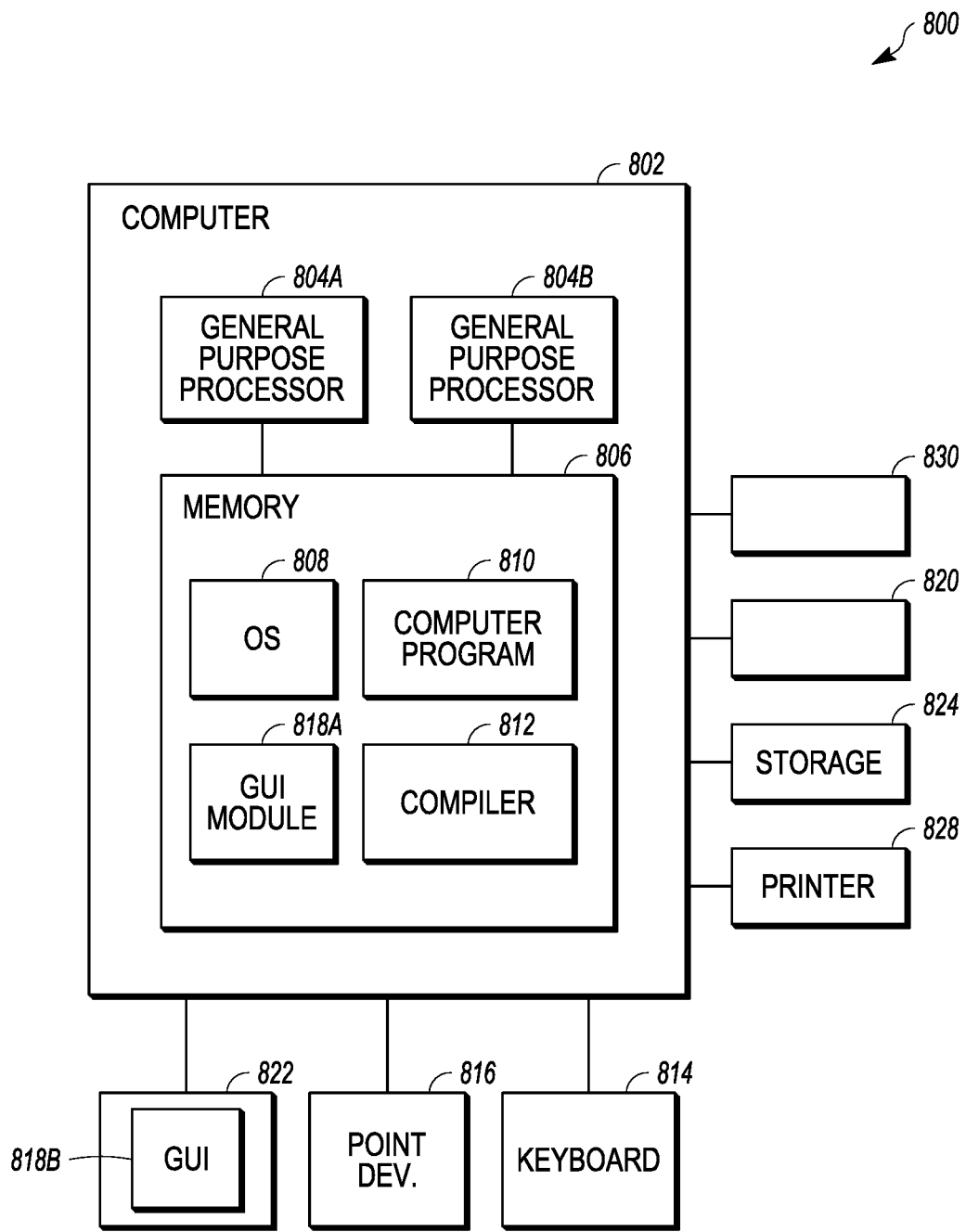
FIG. 8 is a diagram illustrating an exemplary computer system that could be used to implement processing elements of the above disclosure.

FIG. 8 is a diagram illustrating an exemplary computer system 800 that could be used to implement processing elements of the above disclosure, including the defining of the conductive structures and etching of the dielectric layers. The computer 802 comprises at least one processor 804 such as a general purpose processor 804A and/or a special purpose processor 804B and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer, etc. Of course, those skilled in the art will recognize that any combination of the above components, or any number of different components, peripherals, and other devices, may be used with the computer 802, including printer 828.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A conformal antenna, comprising:
a circuit board, comprising:
a composite dielectric, having:
a bottom surface, having:
a bottom surface conductive ground plane;
a top surface, having:
an array of a plurality of antenna elements; and
at least one dielectric lens, each dielectric lens disposed over only one antenna element of at least a subset of the plurality of antenna elements; and
a conductor, extending from an antenna input through the composite dielectric, the conductor forming a microstrip with the bottom surface conductive ground plane.

2. The antenna of claim 1, wherein the dielectric lens is non-planar.

3. The antenna of claim 2, wherein:
the at least one dielectric lens comprises a right circular cone having a base adjacent the only one antenna element of the at least the subset of the plurality of antenna elements.

4. The antenna of claim 1, wherein:
the at least one dielectric lens is of a shape different than at least one another dielectric lens disposed over only one antenna element of another subset of the plurality of antenna elements.

5. The antenna of claim 4, wherein:
the array of the plurality of antenna elements comprises a plurality of rows of antenna elements;
the subset of the plurality of antenna elements comprises a first row of antenna elements; and the another subset of the plurality of antenna elements comprises a second row of antenna elements adjacent the first row of antenna elements.

6. The antenna of claim 5, wherein:
the at least one dielectric lens comprises a first right circular cone having a first base disposed over and adjacent to the only one antenna element of the at least the subset of the plurality of antenna elements; and
the at least one another dielectric lens comprises a second right circular cone having a second base disposed over and adjacent to the only one antenna element of the another subset of the plurality of antenna elements.

7. The antenna of claim 6, wherein:
the first right circular cone has a first height; and
the second right circular cone has a second height different than the first height.

8. A method of forming a conformal antenna, comprising:
disposing an array of a plurality of antenna elements on a top surface of a first dielectric layer;
disposing a conductor on a bottom surface of a second dielectric layer or a top surface of a third dielectric layer;
disposing a bottom surface conductive ground plane on a bottom surface of a fourth dielectric layer;
laminating the first dielectric layer, the second dielectric layer, the third dielectric layer, and the fourth dielectric layer to form a composite dielectric, wherein upon lamination the conductor:
is disposed between each of the antenna elements and the bottom surface conductive ground plane; and
extends from an antenna input and forms a microstrip with the bottom surface conductive ground plane; and
forming at least one dielectric lens, each dielectric lens disposed over only one antenna element of at least a subset of the plurality of antenna elements.

9. The method of claim 8, wherein the dielectric lens is non-planar.

10. The method of claim 9, wherein:
the at least one dielectric lens comprises a right circular cone having a base adjacent the only one antenna element of the at least the subset of the plurality of antenna elements.

11. The method of claim 8, wherein:
the method further comprises:
forming at least one another dielectric lens, each another dielectric lens disposed over only one antenna element of at least another subset of the plurality of antenna elements that excludes the subset of the plurality of antenna elements; and
the at least one dielectric lens is of a shape different than at least one another dielectric lens disposed over only one antenna element of another subset of the plurality of antenna elements.

12. The method of claim 11, wherein:
the array of the plurality of antenna elements comprises a plurality of rows of antenna elements;
the subset of the plurality of antenna elements comprises a first row of antenna elements;
the another subset of the plurality of antenna elements comprises a second row of antenna elements adjacent the first row of antenna elements;
the at least one dielectric lens comprises a first right circular cone having a first base disposed over and adjacent to the only one antenna element of the at least the subset of the plurality of antenna elements;
the at least one another dielectric lens comprises a second right circular cone having a second base disposed over and adjacent to the only one antenna element of the another subset of the plurality of antenna elements;
the first right circular cone has a first height; and
the second right circular cone has a second height.

13. The method of claim 8, wherein:
disposing an array of antenna elements on a top surface of a first dielectric layer comprises:
patterning the array of antenna elements on the top surface of the first dielectric layer;
disposing a conductor on a bottom surface of a second dielectric layer or a top surface of a third dielectric layer comprises:
patterning the conductor on the bottom surface of the second dielectric layer or the top surface of the third dielectric layer; and
disposing a bottom surface conductive ground plane on a bottom surface of a fourth dielectric layer comprises:
patterning the bottom surface conductive ground plane on the bottom surface of the fourth dielectric layer.

14. The method of claim 8, wherein:
disposing an array of antenna elements on a top surface of a first dielectric layer comprises:
printing the array of antenna elements on the top surface of the first dielectric layer;
disposing a conductor on a bottom surface of a second dielectric layer or a top surface of a third dielectric layer comprises:
printing the conductor on the bottom surface of the second dielectric layer or the top surface of the third dielectric layer; and
disposing a bottom surface conductive ground plane on a bottom surface of a fourth dielectric layer comprises:
printing the bottom surface conductive ground plane on the bottom surface of the fourth dielectric layer.

15. The method of claim 8, wherein:
disposing a conductor on a bottom surface of a second dielectric layer or a top surface of a third dielectric layer comprises disposing the conductor on the bottom surface of the second dielectric layer.

16. The method of claim 8, wherein
disposing a conductor on a bottom surface of a second dielectric layer or a top surface of a third dielectric layer comprises disposing the conductor on a top surface of the third dielectric layer.

17. The method of claim 8, wherein forming at least one dielectric lens, each dielectric lens disposed over only one antenna element of at least a subset of the plurality of antenna elements comprises:
printing at least one dielectric lens, each dielectric lens disposed over only one antenna element of at least a subset of the plurality of antenna elements.

18. A conformal antenna, formed by performing steps comprising:
disposing an array of a plurality of antenna elements on a top surface of a first dielectric layer;
disposing a conductor on a bottom surface of a second dielectric layer or a top surface of a third dielectric layer;
disposing a bottom surface conductive ground plane on a bottom surface of a fourth dielectric layer;
laminating the first dielectric layer, the second dielectric layer, the third dielectric layer, and the fourth dielectric layer to form a composite dielectric, wherein upon lamination the conductor:

is disposed between each of the antenna elements and the bottom surface conductive ground plane; and extends from an antenna input and forms a microstrip with the bottom surface conductive ground plane; and forming at least one dielectric lens, each dielectric lens disposed over only one antenna element of at least a subset of the plurality of antenna elements.

19. The conformal antenna of claim 18, wherein:

the at least one dielectric lens comprises a right circular cone having a base adjacent the only one antenna element of the at least the subset of the plurality of antenna elements.

20. The conformal antenna of claim 19, wherein forming at least one dielectric lens, each dielectric lens disposed over only one antenna element of at least a subset of the plurality of antenna elements comprises:

printing at least one dielectric lens, each dielectric lens disposed over only one antenna element of at least a subset of the plurality of antenna elements.

21. A method of transmitting a signal, comprising:

receiving the signal at an input of an antenna, the antenna comprising:

a circuit board, comprising:

a composite dielectric, having:

a bottom surface, having:

a bottom surface conductive ground plane; and a top surface, having:

an array of a plurality of antenna elements;

at least one dielectric lens, each dielectric lens disposed over only one antenna element of at least a subset of the plurality of antenna elements; and a conductor, extending from an antenna input through the composite dielectric, the conductor forming a microstrip with the bottom surface conductive ground plane; and transmitting the received signal via the antenna.

* * * * *